May 23, 1967     R. D. MARTIN     3,320,948

POSITIONING INSTRUMENT CLAMP FOR USE WITH SPECULUM

Filed June 24, 1964     2 Sheets-Sheet 1

RICHARD D. MARTIN

*INVENTOR*

BY *Roy H. Smith Jr.*
ATTORNEY

May 23, 1967 R. D. MARTIN 3,320,948
POSITIONING INSTRUMENT CLAMP FOR USE WITH SPECULUM
Filed June 24, 1964 2 Sheets-Sheet 2

RICHARD D. MARTIN
*INVENTOR*

BY *Roy H. Smith, Jr.*
ATTORNEY

United States Patent Office 3,320,948
Patented May 23, 1967

3,320,948
POSITIONING INSTRUMENT CLAMP FOR USE WITH SPECULUM
Richard D. Martin, Houston, Tex. (% Dept. of Obstetrics and Gynecology, School of Medicine, Emory University, Atlanta, Ga. 30303)
Filed June 24, 1964, Ser. No. 377,689
10 Claims. (Cl. 128—17)

The present invention relates to surgical instruments used in the female genital tract, and more particularly to such instruments as the vaginal speculum, tenaculum forceps, surgical needle and cannula. Primarily the invention comprises a device to be securely but adjustably mounted on a speculum and having incorporated therewith appropriate recesses and clamping means to hold various combinations of the other instruments in desired positions, likewise securely but adjustably.

The present invention was developed as the result of unforeseen difficulties in a procedure used in investigating a pathological condition suspected in the uterus of various individuals. The procedure necessitated the injection of an opaque medium into the wall of the uterus and subsequently observing its migration by X-ray techniques. It was soon discovered that in using only instruments previously available, i.e., a Graves or other speculum, a tenaculum and a surgical needle, as often as not the tip of the needle passed completely through the uterine wall, causing the opaque medium to be injected into the abdominal cavity. This caused some discomfort to the individual, and of course negated the attempted investigation.

This difficulty appears to steam from the fact that it is extremely difficult to detect the extent of penetration of the needle into the wall of the uterus. The blunt tip of the cannular surrounding the needle proper informs the physician of the location of the inner surface of the wall, but is of no help in locating the outer surface. Since the needle proper is necessarily sharp and pointed, and since there are no available means to visualize the wall, it is quite difficult to judge by feel alone the extent of penetration. The situation is further complicated by the fact that in the customary procedure the physician is using his other hand to hold the tenaculum in engagement with the anterior lip of the cervix and thus hold the uterus in traction. Since the force applied through the tenaculum is relied on to hold the uterine wall in a fixed position, it can be appreciated that any involuntary movement of the physician's hands may cause penetration of the needle through the uterine wall and injection of the opaque medium into the abdomen rather than the wall of the uterus.

It is the chief purpose of the present invention to provide a positioning device for mounting on a speculum to fix a tenaculum and/or one or more surgical needles in position relative to the speculum and to the uterus being investigated or treated.

The present invention has also been found useful in many routine procedures using a speculum and other instruments, even through in many such procedures the location of the uterine wall is not critical. Thus it may be used in the Rubin test for tube patency (insufflation of the uterus with $CO_2$ delivered through a cannula), hystero-salpingography (injection of an opaque medium into the uterine cavity and subsequent X-rays), and even for simple observation of the genital tract when a tenaculum is used for better observation. In all such procedures use of the present invention frees the physician from the task of holding one or more instruments in positions of varying criticality, and thus enables him to concentrate his entire attention on the test at hand and the condition and reactions of the patient.

Accordingly, a more general object of the present invention is to provide a means for securing one or more instruments used in genito-uterine procedures in fixed but adjustable relationship to a speculum.

The present invention also embraces an improved surgical needle for the above discussed procedure of injecting material into the uterine wall. As previously indicated, the needle consists of a tubular sheath or cannular having a blunt distal end and a needle proper within the cannula, the needle proper having a sharp distal end, a hollow body throughout its length, and a proximate end equipped with means for attachment to a syringe, tubing or the like extending beyond the same end of the cannula. It is a subsidiary purpose of the present invention to provide cooperating structure on cannula and needle proper so that the distal end of the needle proper may be extruded only a predetermined distance beyond the distal end of the cannula.

The present invention may be more readily understood by reference to the accompanying drawings, hereby incorporated herein, in which drawings:

FIGURE 1 is a perspective view of the positioning device of the present invention installed in operative position on a speculum and engaging a tenaculum and a surgical needle in their operative positions, FIGURE 2 is a view of the same positioning device viewed from the opposite end, the lower blade of the speculum and all other instruments being removed to illustrate how the device is attached to the yoke of the upper blade assembly.

Figure 1:
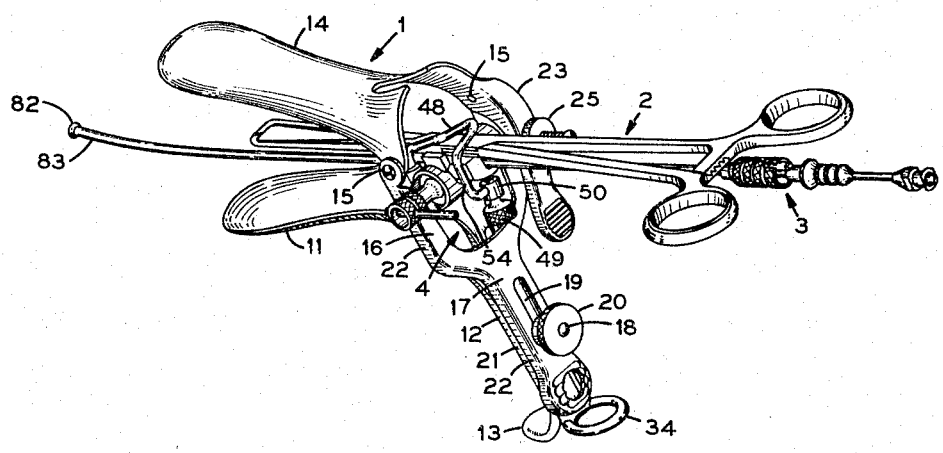
Figure 3:
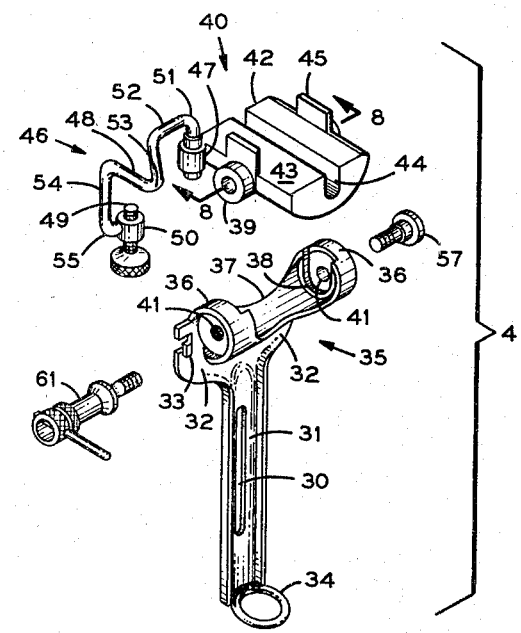
FIGURE 3 is an exploded perspective view of the positioning device alone.
Figure 5:
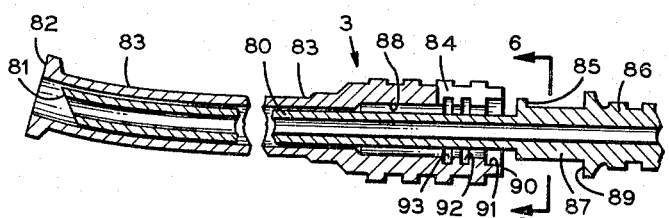
Figure 6:
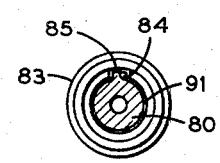
Figure 7:
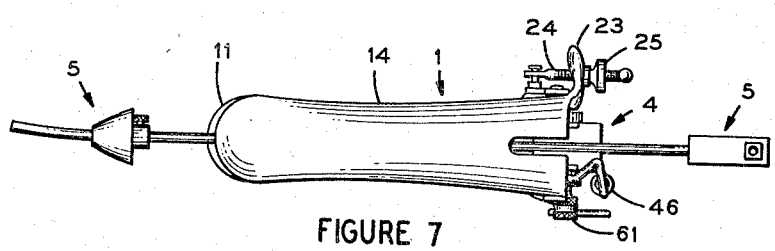
Figure 8:
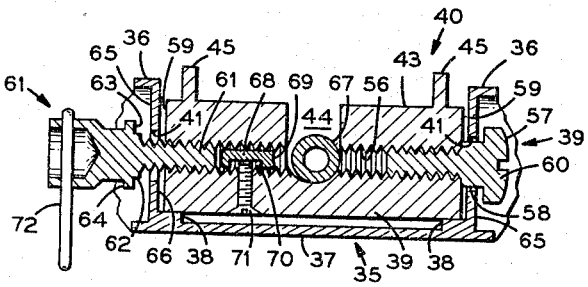
Figure 9:
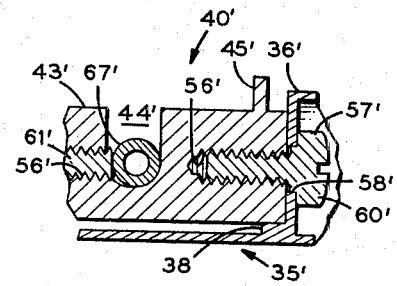
Figure 10:
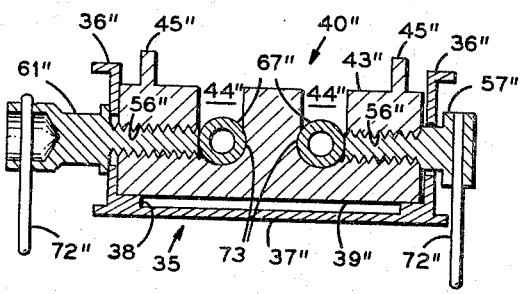

FIGURE 5 is a partial longitudinal section of the needle shown in FIGURE 1, illustrating the manner in which the needle is positioned within its cannular so that its distal protruding end is extendable only a predetermined distance from the end of the cannula, FIGURE 6 is a section on lines 6—6 of FIGURE 5, and FIGURE 7 is a top view of the positioning device assembled with a speculum and a cannula of the type used in various procedures such as the Rubin test, FIGURE 8 is a transverse section of the rocker 40 assembled with its cylindrical housing 35, on lines 8—8 of FIG. 3, FIGURE 9 is a section similar to FIGURE 8 of a modified rocker and housing assembly, and FIGURE 10 is a section like FIGURES 8 and 9 of a rocker and housing assembly modified to accommodate a pair of instruments 67".

In the drawing and FIGURE 1 in particular, the various instruments depicted are generally identified by reference characters, 1 being a speculum, 2 a tenaculum, 3 a surgical needle as improved according to the present invention, 4 the preferred embodiment of the positioning device of the present invention and 5 (see FIG. 7) a cannula of the type used in the Rubin test and other procedures. Any speculum 1 may be used, that illustrated being a Graves speculum having a generally longitudinal lower blade 11 integrally secured to a downwardly extending post 12 terminating in a handle 13 and a generally longitudinal upper blade 14 pivotably mounted by screws 15 on the tines 16 of a yoke or bifurcated supporting post 17. A threaded stud 18 extends from post 12 of lower blade 11 through a vertically elongated slot 19 in support 17, and a large knurled nut 20 is mounted on stud 18 to clamp vertical members 12 and 17 together. Each of members 12 and 17 and the tines 16 of post 17 have their outer portions bent back to form stiffening ribs 21 and 22, such ribs being disposed back-to-back to define a hollow rectangular space between posts 12 and 17. The L-shaped corners formed by such ribs 22 and tines 16 also engage lugs not shown projecting rearwardly from the proximate end of lower blade 11 above post 12, serving as guides when nut 20 is loosened and post 12 is adjusted to a new position. An arm 23 projecting downwardly from the right side of upper blades 14 has an appropriate opening therethrough to accommodate a threaded stud 24 pivotably mounted on the rib 22 of right hand tine 16 (FIG. 1), and a knurled nut 25 is screwed on stud 24 to raise the distal end of blade 14 and prevent it from being lowered until nut 25 is unscrewed.

It will be understood that the speculum just described is intended to be used in the conventional manner, i.e., inserted in the vaginal canal of the patient with the blades thereafter being separated to dilate the canal sufficiently for observation and access of instruments to the genital tract. The instrument is conventional in every respect, and has been described in some detail only to furnish the setting for the positioning device 4 of the present invention.

Figure 2:
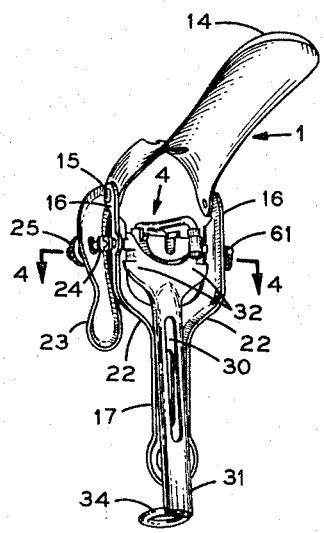
Figure 4:
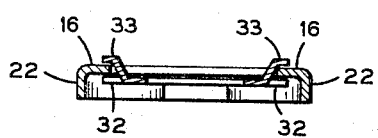
FIGURE 4 is a partial sectional view on lines 4—4 of FIGURE 2 showing in detail how the positioning device fits on the yoke of the upper blade assembly.

As can be most clearly seen in FIGURE 2, device 4 includes a vertical leg 31 of appropriate width and thickness for mounting between the stiffening ribs 21 and 22 of supporting posts 12 and 17 and in the aforementioned space between post 17 and post 12. Vertical leg 31 is bifurcated at and near its upper end to form the yoke having the pair of legs 32, each of which is slidably mounted on a tine 16 of post 17. This can be seen in FIGURE 2 and particularly in FIGURE 4, wherein it is indicated that the back side of each tine 16 is in sliding engagement with a tab 33 punched from leg 32 while the front side of 16 is in sliding contact with the peripheral portion of leg 32 above and below tab 33, leg 32 and tab 33 thus serving as a sliding clamp to secure device 4 to speculum 1. The ring 34 at the base of leg 31 serves as a convenient handle in adjusting the position of device 4, and also serves as a limit stop in ordinary operation. The vertically elongated slot 30 in leg 31 lines up with the corresponding slot 19 of speculum post 17 to accommodate stud 18. When nut 20 is tightened on stud 18 to clamp posts 12 and 17 together, leg 31 of device 4 is also clamped in a fixed vertical position.

FIGURE 3 illustrates the positioning device 4 of the present invention apart from other instruments, an exploded view being used to better illustrate the arrangement, cooperation and disposition of parts. As there indicated, the leg 31 includes at the top a transversely mounted open cylindrical housing 35 consisting of end sockets 36 and connecting web 37. One end socket 36 is securely attached to each yoke leg 32, and each has a ridge portion 38 on its inner face adapted to receive an end of the cylindrical pivot 39 of rocker or cradle member 40. Openings 41 in end sockets 36 are coaxial and of appropriate size to receive screws 57 and 61.

Rocker 40 includes above pivot 39 a mounting portion or body 42 having a flat upper surface 43, an axial groove 44 therethrough downwardly from flat surface 43, and an upstanding ridge 45 at either side of surface 43 and generally normal thereto. Rocker 40 is pivotably mounted in the end sockets 36 of housing 35, the ends of the cylindrical surface of pivot members 39 bearing against the bottom, semi-cylindrical portions of ridges 38. Also secured to rocker 40, for independent rotation about an axis normal to surface 43, is the wire or spring clamp 46, consisting of socket 47, rotatable bent spring 48 pivotably mounted in socket 47 and secured therein against movement axially of the pivot, and screw 49 mounted in a threaded boss 50 at the other end of spring 48.

It will be apparent that the above-described mounting of rocker 40 in housing 35 is such that assembly and disassembly are readily effected. FIGURE 8 indicates a preferred further assembly to prevent an inadvertent separation of parts and to control both the angle of tilt of rocker 40 with respect to the generally horizontal axis of speculum 1 (along the elongated dimension of lower blade 11) and the axial position of a cannula or other instrument 67 mounted in groove 44. As therein indicated, pivot portion 39 of rocker 40 has a threaded hole or passage 56 therethrough intersecting the lower part of groove 44. Screw 57 is threaded into hole 56 from the right but fails to clamp rocker 40 to socket 36 because its shoulder portion 58, passing through opening 41 and butting against end face 59, is of such length that the underface of screw head 60 cannot bear against the outer face 65 of socket 36. Thus screw 57 serves only as a pivot pin and can be replaced by such a pin or equivalent.

At the left side of housing 35 as shown in FIGURE 8 a screw 61 extends through opening 41 of socket 36 and engages the threads in hole 56. Unlike screw 57, screw 61 has a relatively short shoulder 62 which passes through opening 41 and bears against end face 59 of the pivot 39 to permit the underface 63 of screw head 64 to bear against the outer face 65 of socket 36. As screw 61 is tightened, rocker 40 is pulled up so that the adjacent faces 66 of socket 36 and 59 of pivot 39 are tightly engaged, thus securing rocker 40 in a predetermined attitude of inclination with respect to the longitudinal axis of speculum lower blade 11.

The tightening of screw 61 at the same time serves the function of clamping in position an instrument 67 disposed in groove 44. This may be accomplished simply by providing a longer length screw than that shown in FIGURE 7, a length sufficient so that in its fully tightened position the free end of screw 61 will bear against instrument 67 and clamp it to the wall of groove 44. The structure illustrated is one designed particularly for hollow instruments of circular cross-section such as the surgical needle 3 of FIGURE 1, cannulae, etc. As shown in FIGURE 8, an unthreaded short pin 68 is mounted in the left hand part of hole 56 adjacent groove 44. Pin 68 has an end 69 facing groove 44 contoured arcuately to conform to the size instrument 67 likely to be inserted in the groove 44. A portion of its lower part is machined off to define a groove 70 accommodating set screw 71 threadedly engaging an appropriate passage extending upwardly from the lower surface of pivot 39. Groove 70 is located axially intermediate the ends of pin 68, leaving shoulders engageable by set screw 71 to define the limits of travel of the pin, both serving to prevent accidental loss of the pin, and that shoulder engaged when screw 61 is fully tightened serving to define a limit to the clamping action of pin and screw on instrument 67.

It will be apparent from the above that the tightening of screw 61, quite easily accomplished by manipulating the spoke 72 in the outer end of the screw, both secures the instrument 67 in a predetermined axial position and secures the rocker 40 and thus all instruments secured to it in a predetermined attitude, screw 57 serving as only a pivot pin and means to prevent accidental upward separation of rocker 40 from its housing 35. This has been done deliberately, in the belief that the fewer the number of manipulative steps required of the physician, the greater will be his ability to make the best use of the instrument. Other arrangements providing separate adjustments for securing instrument 67 and controlling its attitude are possible and will be mentioned below in connection with FIGURES 9 and 10.

The spring clamp 46 pivotably mounted on rocker 40 is designed to cooperate with surface 43 and ridges 45 to secure a tenaculum 2 in a predetermined axial operative position, as shown in FIGURE 1, these parts acting together to define both a groove and a clamp for the tenaculum. As can be seen in FIGURES 1 and 3, the spring wire 48 of clamp 46 includes a vertical end 51 pivotably secured in socket 47 (secured to body 42 of rocker 40) and restrained thereby against axial movement with respect to socket 47, a horizontal portion 52 joined to end 51 and bent at 53 to define an unsupported corner, vertical leg 54 joined to 52 and extending below body 42 of rocker 40, generally horizontal arm 55 below rocker 40 joining vertical leg 54, and the enlarged end or boss 50 of 55 at about the bottom center of 42 or slightly displaced from the axis thereof on the side opposite socket 47. Boss 50 has a vertical opening therethrough threaded to receive knurled thumbscrew 49, the free end of the latter being engageable with the nether surface of 42 to pull down the horizontal portion 52 of spring 48 and clamp a tenaculum 2 tightly against surface 43. In the operative position of FIGURE 1, vertical leg 54 of spring 48 bears against a side of body 42 to prevent the horizontal portion 52 from pulling down against the top of either ridge 45, and also thus approximately centers screw 49 on slot 44. When spring clamp 46 is not to be used or interferes with a changeover of instruments, it may be swung out of the way as indicated in FIGURE 7.

FIGURE 5 is a longitudinal cross section of the surgical needle 3 shown in FIGURE 1, modified according to the present invention to provide a definite control over the extent to which distal end 81 extends beyond the blunt distal end 82 of the cannula 83 surrounding hollow needle 80. The proximate end of the cannula has therein a longitudinal slot 84 of sufficient width to accommodate upstanding lug 85 of needle handle 86. Cylindrical portion 87 of handle 86 is slidable within the enlarged bore portion 88 of the cannula, an ultimate stop being provided by the engagement of handle face 89 against end face 90 of the cannula. Extending circumferentially around and through bore 88 of the cannula are a series of annular grooves 91, 92 and 93, each being of size to accommodate lug 85 and to permit full rotation of needle 86. When lug 85 engages grooves 92 and 93 grooves in order, the corresponding extents of distal end 81 of the needle beyond the distal end of cannula 82 are 3 mm. and 5 mm., respectively. Groove 91 is not a locking groove and is not intended as an operative position.

It should also be noted that the radial position of longitudinal groove or slot 84 affords an indication of the orientation of the curved distal portion of needle 3. FIGURE 5 shows the reference position most commonly used, and it is apparent that rotation of the entire cannula 83 and clamping it in a different azimuthal position with screw 61 (FIGURE 8) necessarily involves equal rotations of the curved distal end and of longitudinal slot 84. As the former is not clearly visible in operative position, the radial position of the latter gives the desired indication.

FIGURE 7 shows a cannula 5 in operative position in a speculum 1 and the positioning device 4 of the present invention. In this top view the tenaculum has been removed and spring clamp 46 has been swung to one side for clarity. Note that the curved distal end of the cannula is shown in a position to inject an opaque medium into one side of the uterine cavity.

FIGURES 9 and 10 are similar to FIGURE 8 but show modifications of the rocker and its cylindrical housing, FIGURE 9 for mounting a single instrument and FIGURE 10 for mounting a pair of instruments. In FIGURE 9 the slot or longitudinal groove 44' is of sufficient width to accommodate instruments 67' having a range and variety of cross sections, and screw 61', similar in other respects to screw 57 of FIGURE 8, extends through the left hand portion of opening 56' to directly clamp instrument 67. On the right hand side, opening 56' is a blind hole threaded to engage screw 57', the latter differing from screw 57 of FIGURE 8 in that its shoulder 58' is much shorter, thus permitting the underface of screw head 60' to bear against the outer face of end socket 36' to clamp rocker 40' against rotation. With this disposition and cooperation of parts, screw 61' clamps the instrument 67' in position while screw 57' fixes the tilt or attitude of rocker 40', but it is believed to be apparent that the instrument clamping and rocker clamping functions may be readily shifted about.

FIGURE 10 illustrates a rocker 40" and rocker mounting (housing) assembly 35 capable of mounting a pair of tube type instruments 67" simultaneously. The rocker 40" is modified so that it has a pair of longitudinal grooves 44", each of which accommodates an instrument 67". The means for fixing the left hand tube 67" in a definite longitudinal position and for controlling the attitude of rocker 40" are identical with the corresponding means shown in FIGURE 8 except for the omission of sliding pin 68 and set screw 71, and the right hand side of FIGURE 10 is a mirror image of the left hand side except that screw 57" has no surface bearing against a surface of socket 36". Thus screw 57" both serves as a pivot and secures right hand instrument 67" in position, while screw 61" serves both of these functions on the left and, in addition, controls the attitude of rocker 40". Screw 57" is adjusted by a spoke 72", thus avoiding interference with arm 23 and stud 25 of the speculum. It should be noted that the inner sidewall of each groove 44" is slightly dished out near the bottom of the groove, as at 73, to accommodate the instruments 67".

What is claimed is:

1. In a speculum of the type having a pair of blades elongated along a longitudinal axis and a pair of legs secured to and depending from the rearward ends of said blades in one-to-one relationship, said legs being adjustably secured together to define a space between said blades for the insertion of various elongated instruments used in genito-uterine investigations and procedures, said instruments being inserted between said blades generally parallel to their longitudinal axis, said instruments including a tenaculum, surgical needles and cannulae, the improvement comprising a positioning device for securing at least one of said instruments to said speculum, said device comprising:
   (1) a leg member secured to said speculum, said leg member having at the top thereof a rocker housing transverse to the longitudinal axis of said speculum and generally between the rearward ends of the speculum blades,
   (2) a rocker member secured in said housing, said rocker member having one or more grooves extending axially therethrough to receive one or more of said surgical needles and cannulae, and
   (3) means for removably securing such instruments in said grooves in fixed axial positions.

2. The positioning device of claim 1 in which said leg of said device is adjustably secured to the legs of said speculum and is slidable in relation thereto to obtain a spectrum of positions of said housing between the speculum blades.

3. The positioning device of claim 1 in which said rocker is pivotably secured to said housing and which includes means for securing said rocker in fixed pivotal positions.

4. The positioning device of claim 1 which includes means mounted on and cooperating with said rocker for securing thereto a tenaculum extending between the speculum blades in the elongated direction thereof.

5. The positioning device of claim 4 in which said rocker has a flat upper surface and a pair of ridges upstanding therefrom adjacent the side edges thereof, and which device includes a clamping member mounted on and cooperating with said rocker to secure such tenaculum to said rocker surface and between said ridges.

6. The positioning device of claim 5 in which said clamping member comprises a spring pivotally mounted at one end on a side of said rocker, said spring having a portion extending in clamping position generally parallel to said rocker face and in spaced relationship thereabove, and terminating at its other end in means adjustably engaging the underside of said rocker to exert a downward clamping force on said portion parallel to the rocker face.

7. The positioning device of claim 1 in which said rocker is pivotally mounted in said housing by a pair of screws extending through coaxial holes in the ends of said housing into holes in said rocker, one of said screws serving as a pivot while the other is adjustable both to fix the azimuthal position of said rocker by a clamping engagement between a shoulder thereof and the outer surface of one said housing end, and to secure such instrument in position.

8. The position device of claim 7 in which the screw securing such instrument in position terminates in said hole before the intersection of said hole accommodating said instrument with said groove and which includes a short pin slidable in the balance of said hole, said pin having a portion machined away from its nether surface between its ends to define a pair of shoulders and having its end facing said groove contoured conformably with said instrument, and a set screw through said rocker with its free end entering said hole between the shoulders of said pin.

9. The positioning device of claim 1 in which said rocker housing has a pair of transversely spaced, upwardly projecting end sockets, said rocker is pivotally mounted in said end sockets and includes two said grooves, said end sockets having coaxial holes therethrough transverse said longitudinal axis of the speculum blades and said rocker having a pair of holes coaxial with each other and said end sockets holes and each extending from one side into one said groove, and which includes a pair of screws each extending through an end socket hole and threadedly engaging one said rocker hole, each screw serving as a pivot and extending through said rocker hole to engage one said instrument and at least one said screw also serving to fix the azimuthal position of said rocker by a clamping engagement of a shoulder thereof with an end face of the housing.

10. A surgical needle accommodated in one of the grooves of the rocker member of claim 1 and adjustably secured therein by said securing means, said surgical needle comprising (1) a hollow sheath or cannula, said cannula having a longitudinal slot in its inner surface extending a short distance from its proximate end and a multiplicity of spaced circumferential grooves in its inner surface intersecting said longitudinal slot, and (2) a hollow needle slidable within said cannula having a lug protruding from its outer surface, such lug being slidable in said longitudinal slot and circumferential grooves, and having shoulder means larger than the opening in said cannula to serve as a stop, whereby the distal end of said hollow needle may be extended only known, predetermined distances beyond the distal end of said cannula.

References Cited by the Examiner
UNITED STATES PATENTS

| | | | |
|---|---|---|---|
| 1,621,805 | 3/1927 | Marshall | 128—20 |
| 2,070,670 | 2/1937 | Nasett | 269—142 X |
| 2,566,499 | 9/1951 | Richter | 128—221 |
| 2,670,732 | 3/1954 | Nelson | 128—20 |
| 3,209,755 | 10/1965 | McCarthy et al. | 128—348 |

FOREIGN PATENTS 820,618   8/1937   France.

OTHER REFERENCES

Martin: "Instrumentation and Technique for Uterine Phlebography," from American Journal of Obstet & Gyne., volume 85, No. 1, Jan. 1, 1963, pages 125–26.

RICHARD A. GAUDET, *Primary Examiner.*

D. L. TRULUCK, *Assistant Examiner.*